United States Patent
Chen et al.

(10) Patent No.: US 11,945,065 B2
(45) Date of Patent: Apr. 2, 2024

(54) MULTI-AXIS TURNTABLE

(71) Applicant: KEDE NUMERICAL CONTROL CO., LTD., Dalian (CN)

(72) Inventors: Hu Chen, Dalian (CN); Xin Deng, Dalian (CN); Zhihong Wei, Dalian (CN); Hongwei Sun, Dalian (CN); Yapeng Li, Dalian (CN); Haibo Zhang, Dalian (CN); Changlin Du, Dalian (CN); Cuijuan Guo, Dalian (CN); Guoshuai Zhang, Dalian (CN); Jun Wang, Dalian (CN); Feng Wang, Dalian (CN); Yinghua Li, Dalian (CN); Shaoyi Liu, Dalian (CN); Zidan Ju, Dalian (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 0 days.

(21) Appl. No.: 17/786,350

(22) PCT Filed: Nov. 27, 2020

(86) PCT No.: PCT/CN2020/132119
§ 371 (c)(1),
(2) Date: Jun. 16, 2022

(87) PCT Pub. No.: WO2021/135758
PCT Pub. Date: Jul. 8, 2021

(65) Prior Publication Data
US 2023/0023718 A1    Jan. 26, 2023

(30) Foreign Application Priority Data
Dec. 31, 2019 (CN) .......................... 201911419330.3

(51) Int. Cl.
*B23Q 1/25* (2006.01)
*B23Q 5/28* (2006.01)

(52) U.S. Cl.
CPC ................. *B23Q 1/25* (2013.01); *B23Q 5/28* (2013.01); *B23Q 2220/004* (2013.01); *Y10T 409/305824* (2015.01)

(58) Field of Classification Search
CPC ........................... B23Q 1/5437; B23Q 1/5468
See application file for complete search history.

(56) References Cited

U.S. PATENT DOCUMENTS 3,700,228 A * 10/1972 Peale ................... B23Q 1/5437
269/57

FOREIGN PATENT DOCUMENTS

CN    103072011 A    5/2013
CN    106624837 A    5/2017
(Continued)

*Primary Examiner* — Tyrone V Hall, Jr.
(74) *Attorney, Agent, or Firm* — MUNCY, GEISSLER, OLDS & LOWE, PC

(57) ABSTRACT

A multi-axis turntable includes a base, a rocker arm and a first driving device capable of driving the rocker arm to rock around the first rotation axis on the base. A swing arm and a second driving device, which is capable of driving the swing arm to swing around the second rotation axis on the rocker arm, are provided on the rocker arm. A workbench and a third driving device for driving the workbench to rotate around the third rotation axis are provided on the swing arm. The second rotation axis and the third rotation axis are parallel to each other or on different planes. Compared with the existing double rotating shaft turntable, the multi-axis turntable of the present invention has a cutting tool system of good and stable rigidity.

6 Claims, 4 Drawing Sheets

(56) References Cited

FOREIGN PATENT DOCUMENTS

| | | | |
|---|---|---|---|
| CN | 106785328 | A | 5/2017 |
| CN | 108453622 | A | 8/2018 |
| CN | 109238609 | A | 1/2019 |
| CN | 109514286 | A * | 3/2019 |
| CN | 111037318 | A | 4/2020 |
| CN | 211728296 | U | 10/2020 |
| DE | 4108076 | C1 | 8/1992 |

* cited by examiner

MULTI-AXIS TURNTABLE

TECHNICAL FIELD

The present invention relates to the technical field of machine tool, specifically, to a multi-axis turntable.

BACKGROUND ART

At present, a common double rotating shaft turntable is generally composed of a swing rotating shaft and a rotating shaft. The two rotating shafts are generally arranged to intersect each other or be offset by a certain distance, and once the design and manufacture are completed, the design and manufacture cannot be changed, as shown in FIG. 1. The existing turntable is suitable for machining workpieces with the same size as the table top of the workbench, but when machining a smaller workpiece, in order to approach the machining area, it is necessary to use a longer cutting tool, or make the spindle protrude with a longer overhang, resulting in the deterioration of the rigidity of the cutting tool system, a decrease in the surface quality of the workpiece, or even a size over tolerance, and thus, the existing turntable has limitations on the size of the parts to be machined, and is not versatile and flexible enough.

SUMMARY OF INVENTION

In view of the above problems, a multi-axis turntable is researched and designed in the present invention. The technical solution adopted in the present invention is as follows:
a multi-axis turntable, comprising: a base; a rocker arm; and a first driving device capable of driving the rocker arm to rock around a first rotation axis on the base, wherein a swing arm and a second driving device, which is capable of driving the swing arm to swing around a second rotation axis on the rocker arm, are provided on the rocker arm; a workbench and a third driving device for driving the workbench to rotate around a third rotation axis are provided on the swing arm; and the second rotation axis and the third rotation axis are parallel to each other or on different planes.

Further, the first rotation axis and the second rotation axis intersect each other or are on different planes.

Further, the swinging angle of the swing arm ranges from 0° to 180°. The swinging angle of the swing arm is the angle between the first rotation axis and the line connecting the third rotation axis and the second rotation axis in the workbench plane.

Further, as the swinging angle of the swing arm changes from 0° to 180°, the normal distance from the third rotation axis to the first rotation axis first increases monotonically and then decreases monotonically, or first decreases monotonically and then increases monotonically.

Further, as the swinging angle of the swing arm changes from 0° to 90°, the normal distance from the third rotation axis to the first rotation axis increases monotonically; and as the swinging angle of the swing arm changes from 90° to 180°, the normal distance from the third rotation axis to the first rotation axis decreases monotonically.

Further, the first driving device and the second driving device both include an electric motor and a reducer; and the third driving device is a power mechanism directly driven by a torque motor.

Compared with the prior art, the multi-axis turntable of the present invention has the following advantages.

(1) Compared with the existing double rotating shaft turntable, the multi-axis turntable of the present invention introduces a swingable swing arm, so that the normal distance from the third rotation axis to the first rotation axis is continuously adjustable. Regardless of the size of the workpiece, by adjusting the swinging angle, the workpiece machining area is concentrated near the first rotation axis as much as possible, the overhang of the cutting tool or the overhang of the spindle is basically stable in a small range, and the cutting tool system obtains good and stable rigidity, and thus, the workpiece can obtain consistent and stable surface quality.

(2) Since the workpiece machining area is concentrated near the first rotation axis as much as possible, the machining area is concentrated and the follow compensation movement distance of each shaft is greatly reduced, and thus, the multi-axis turntable has better control characteristics and machining accuracy.

(3) The workpiece is basically offset to one side of the first rotation axis, and the other side can save the space for basic components such as linear shaft, and thus, the interference area is small, the proximity is better, and the good rigidity of the whole machine is easy to obtain.

(4) In the renovation of old equipment, the present invention can be applied to expand the machining range of machine tool and improve the machining accuracy without changing the three-axis stroke.

(5) The multi-axis turntable of the present invention is suitable for but not limited to the machining of impellers and blisks in the aviation field, and can also be applied to gears and propellers, and has wide application prospects in industries such as gas turbines, marine propellers, water pumps, and fans.

Figure 1:
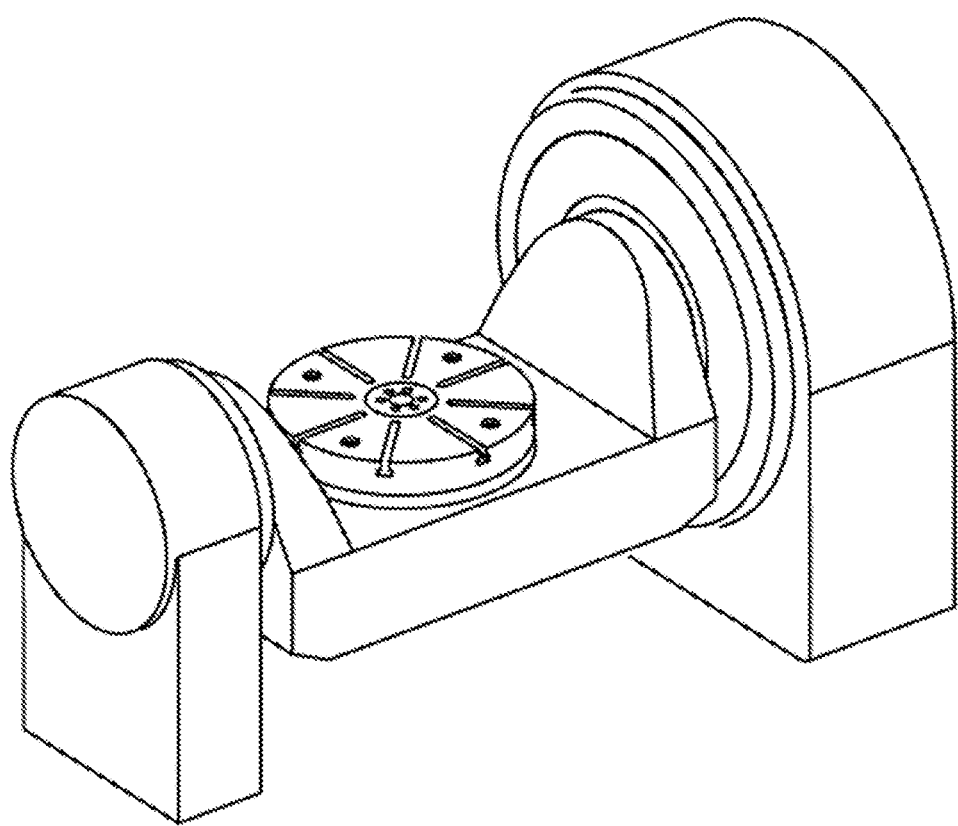
FIG. 1 is a schematic structural diagram of a double rotating shaft turntable in the prior art.
Figure 2:
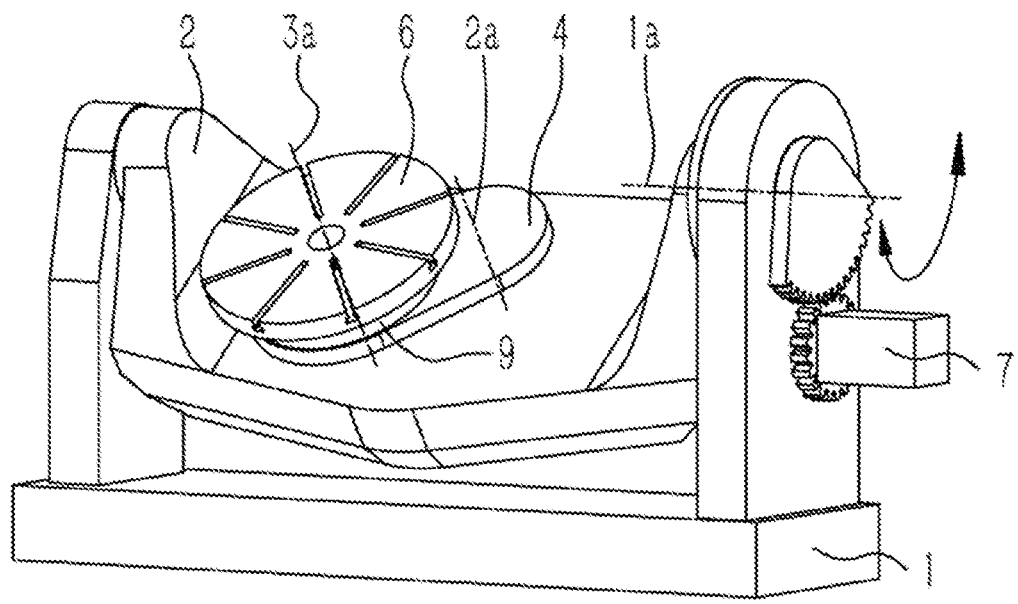
FIG. 2 is a schematic structural diagram of an embodiment 1 of the present invention.
Figure 3:
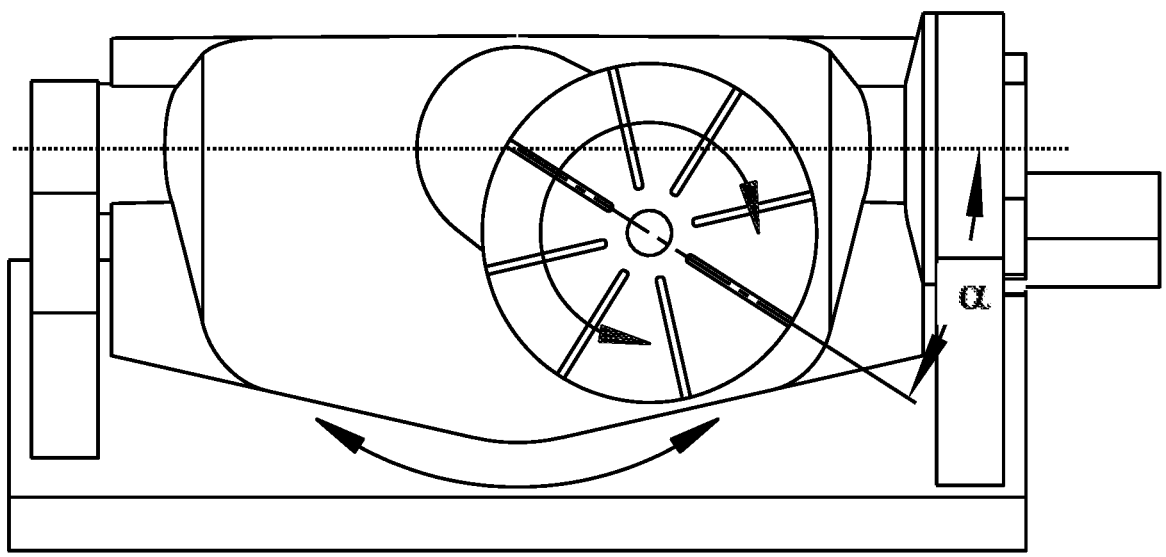
FIG. 3 is a schematic view of a workbench plane projection of the embodiment 1 of the present invention.
Figure 4:
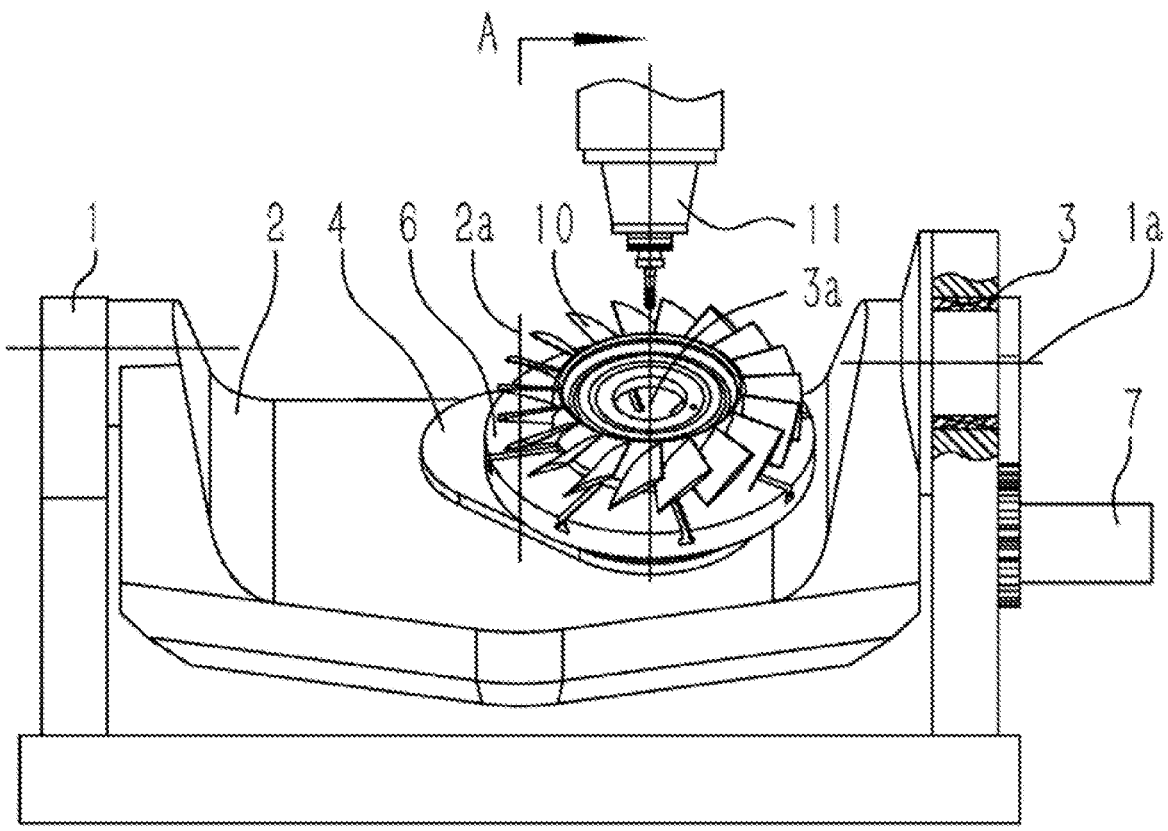
FIG. 4 is a schematic diagram of a workpiece machining state according to the embodiment 1 of the present invention.
Figure 5:
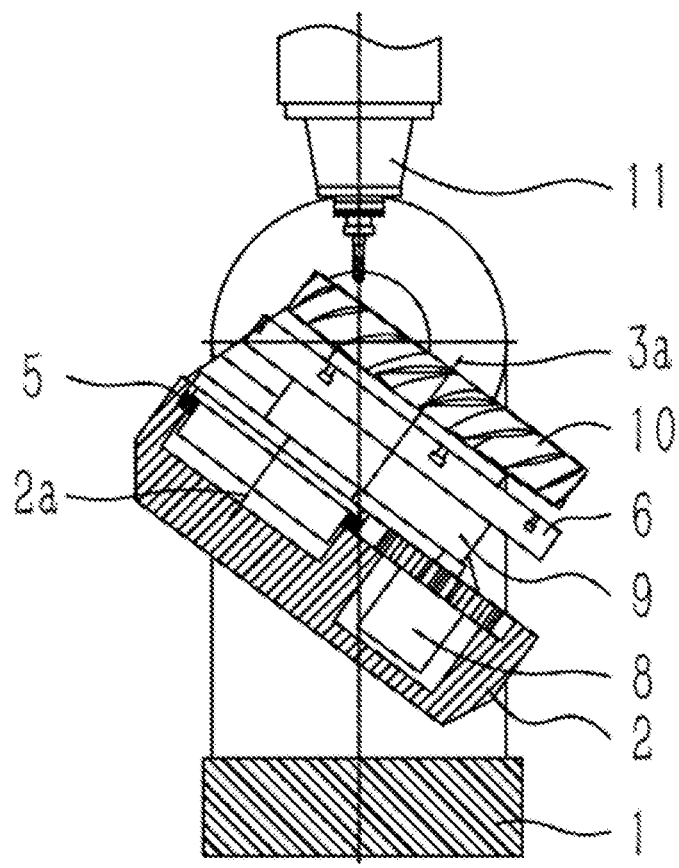
FIG. 5 is a schematic cross-sectional view taken along the line A-A of FIG. 4.

In the figures: 1. base, 2. rocker arm, 3. first support bearing, 4. swing arm, 5. second support bearing, 6. workbench, 7. first driving device, 8. second driving device, 9. third driving device, 10. workpiece, 11. spindle and cutting tool, 1$a$. first rotation axis, 2$a$. second rotation axis, 3$a$. third rotation axis, $\alpha$. swinging angle, L. normal distance, L23. the distance from the projection of the connection between the third rotation axis and the second rotation axis to the workbench plane.

DESCRIPTION OF EMBODIMENTS

Embodiment 1

As shown in FIGS. 2-5, a multi-axis turntable includes a base 1; a rocker arm 2; and a first driving device 7 capable of driving the rocker arm 2 to rock around a first rotation axis 1a on the base 1, wherein the rocker arm 2 is arranged on the base 1 via a first support bearing 3 and a second support bearing 5; a swing arm 4 and a second driving device 8, which is capable of driving the swing arm 4 to swing around a second rotation axis 2a on the rocker arm 2, are provided on the rocker arm 2; a workbench 6 and a third driving device 9 for driving the workbench 6 to rotate around a third rotation axis 3a are provided on the swing arm 4; and the second rotation axis 2a and the third rotation axis 3a are parallel to each other or on different planes in a manner that the two are offset by a certain distance, preferably in a manner that the two are parallel to each other.

The first rotation axis 1a and the second rotation axis 2a intersect each other or are on different planes, that is, the first rotation axis 1a and the second rotation axis 2a intersect each other or there is a certain distance between the two, and preferably, the two are arranged to intersect each other.

The swinging angle α of the swing arm 4 ranges from 0° to 180°. The swinging angle α of the swing arm 4 is the angle between the first rotation axis and the line L23 connecting the third rotation axis 3a and the second rotation axis 2a in the plane of the workbench 6.

As the swinging angle α of the swing arm 4 changes from 0° to 180°, when the swing arm 4 rotates around the second rotation axis 2a, the normal distance L of the workbench 6 from the third rotation axis 3a to the first rotation axis 1a varies with the swinging angle α in a linear curve according to a function law. The normal distance L from the third rotation axis 3a to the first rotation axis 1a is made continuously adjustable. Regardless of the size of the workpiece 10, by adjusting the swinging angle, the workpiece machining area is made as concentrated as possible near the first rotation axis, and the overhang of the cutting tool 11 or the overhang of the spindle is basically stable in a small range, the cutting tool system has good and stable rigidity, and thus, the workpiece can obtain a surface quality with stable consistency. In a preferred embodiment, the normal distance L from the third rotation axis 3a to the first rotation axis 1a first increases monotonically and then decreases monotonically, or first decreases monotonically and then increases monotonically. In a more preferred embodiment, as the swinging angle of the swing arm changes from 0° to 90°, the normal distance L from the third rotation axis 3a to the first rotation axis 1a increases monotonically; as the swinging angle of the swing arm changes from 90° to 180°, the normal distance from the third rotation axis to the first rotation axis decreases monotonically. That is to say, when the line L23 connecting the third rotation axis 3a and the second rotation axis 2a in the plane of the workbench 6 is in the third quadrant, the normal distance L from the third rotation axis 3a to the first rotation axis 1a increases or decreases monotonically. Accordingly, when in the fourth quadrant, the normal distance L from the third rotation axis 3a to the first rotation axis 1a decreases or increases monotonically.

The first driving device 7 and the second driving device 8 both include an electric motor and a reducer, and the third driving device 9 is a power mechanism directly driven by a torque motor. The rocker arm 2 in this embodiment is a rocker arm with support structure at both ends. Both ends of the rocker arm 2 are arranged on the base 1 via the first support bearing 3, and one end of the two is provided with the first driving device 7 to drive the rocker arm 2 to rock.

Due to the concentrated machining area, the follow compensation movement distance on each axis is greatly reduced in this embodiment, which has better control characteristics. The workpiece is basically offset to one side of the first rotation axis, and the other side can save the space for basic components such as linear shaft, and thus, the interference area is small, the proximity is better, and the good rigidity of the whole machine is easy to obtain. At the same time, in the renovation of old equipment, the present invention can be applied to expand the machining range of machine tool without changing the three-axis stroke. This embodiment is not limited to the machining of impellers and blisks in the aviation field, and can also be applied to gears and propellers, and has wide application prospects in industries such as gas turbines, marine propellers, water pumps, and fans.

Embodiment 2

Figure 6:
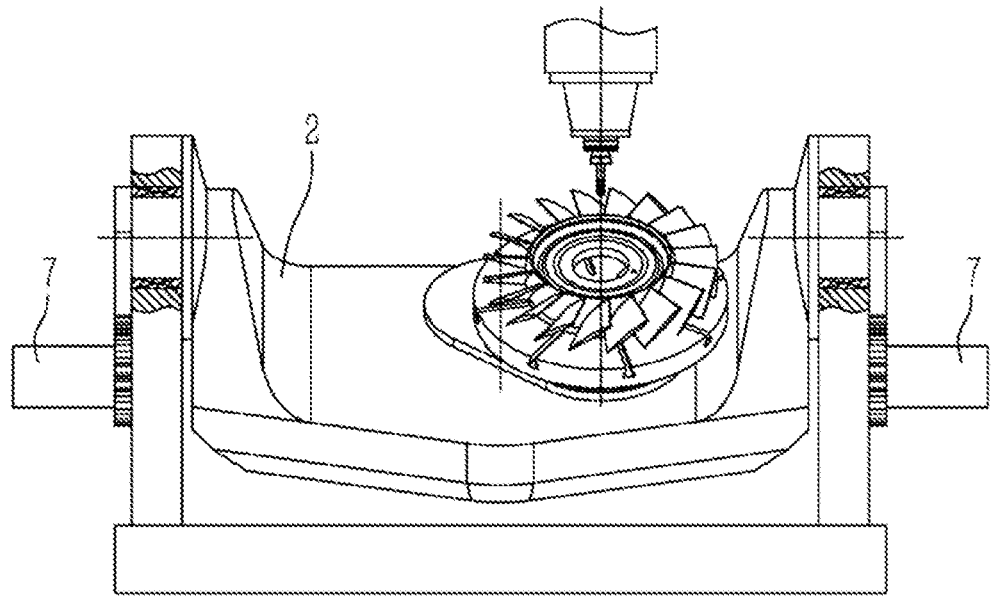
FIG. 6 is a schematic structural diagram of an embodiment 2 of the present invention.

As shown in FIG. 6, the difference between this embodiment and the embodiment 1 is that the two ends of the rocker arm 2 are both provided with the corresponding first driving devices 7 to drive the rocker arm to move from both sides. Other structures of this embodiment are the same as those of the embodiment 1.

Embodiment 3

Figure 7:
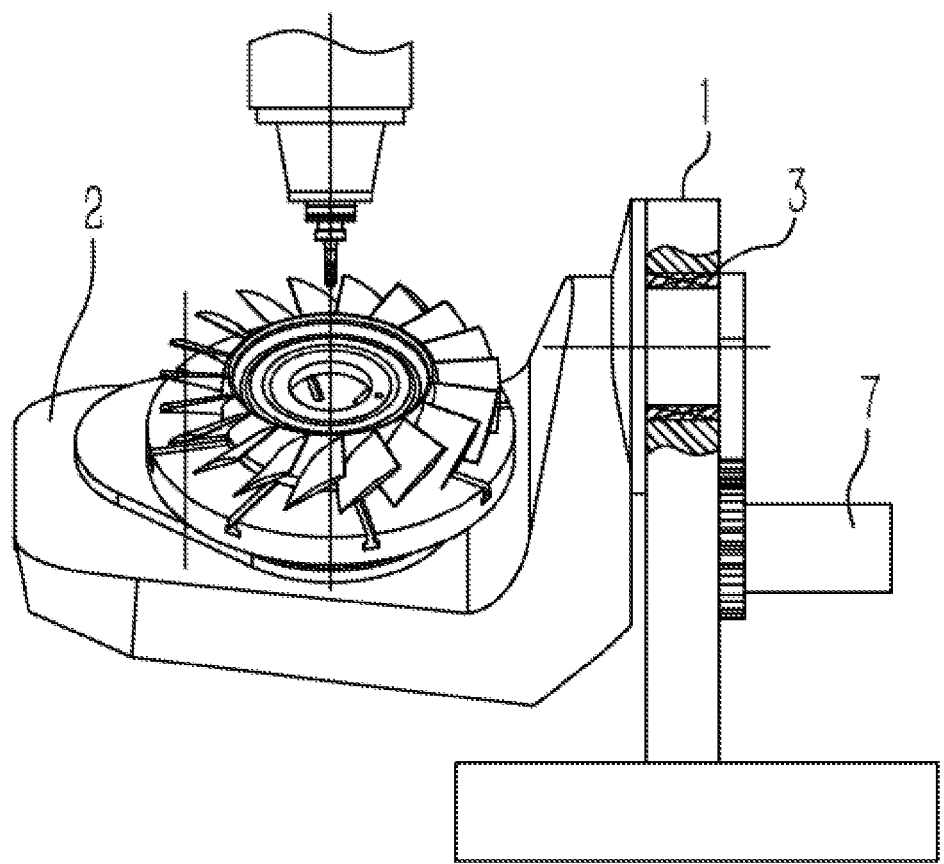
FIG. 7 is a schematic structural diagram of an embodiment 3 of the present invention.

As shown in FIG. 7, the difference between this embodiment and the embodiment 1 is that one end of the rocker arm 2 is arranged on the base 1 via the first support bearing 3, and the first driving device 7 is arranged at this end of the rocker arm 2. Other structures of this embodiment are the same as those of the embodiment 1.

The above-mentioned embodiments merely describe the preferred embodiments of the present invention, and do not limit the scope of the present invention. Without departing from the design spirit of the present invention, various modifications and improvements made by a person skilled in the art on the technical solution of the present invention shall fall within the protection scope determined by the claims of the present invention.

The invention claimed is:

1. A multi-axis turntable, comprising: a base; a rocker arm; and a first driving device capable of driving the rocker arm to rock around a first rotation axis on the base, wherein a swing arm and a second driving device, which is capable of driving the swing arm to swing around a second rotation axis on the rocker arm, are provided on the rocker arm; a workbench and a third driving device for driving the workbench to rotate around a third rotation axis are provided on the swing arm; and the second rotation axis and the third rotation axis are parallel to each other or on different planes;
   wherein two ends of the rocker arm are both provided with the corresponding first driving devices to drive the rocker arm to move from both sides;
   wherein one of the two ends of the rocker arm is arranged on the base via the first support bearing, and the first driving device is arranged at the one of the two ends of the rocker arm.

2. The multi-axis turntable according to claim 1, wherein the first rotation axis and the second rotation axis intersect each other or are on different planes.

3. The multi-axis turntable according to claim 2, wherein the swinging angle of the swing arm ranges from 0° to 180°.

4. The multi-axis turntable according to claim 3, wherein as the swinging angle of the swing arm changes from 0° to 180°, the normal distance from the third rotation axis to the first rotation axis first increases monotonically and then decreases monotonically, or first decreases monotonically and then increases monotonically.

5. The multi-axis turntable according to claim 4, wherein as the swinging angle of the swing arm changes from 0° to 90°, the normal distance from the third rotation axis to the first rotation axis increases monotonically; and as the swinging angle of the swing arm changes from 90° to 180°, the normal distance from the third rotation axis to the first rotation axis decreases monotonically.

6. The multi-axis turntable according to claim 1, wherein the first driving device and the second driving device both include an electric motor and a reducer; and the third driving device is a power mechanism directly driven by a torque motor.

\* \* \* \* \*